April 7, 1931.    P. PIERCE    1,799,178
PORTABLE KNOCKDOWN HOLDER FOR PICTURE SIGNS
Filed April 15, 1929
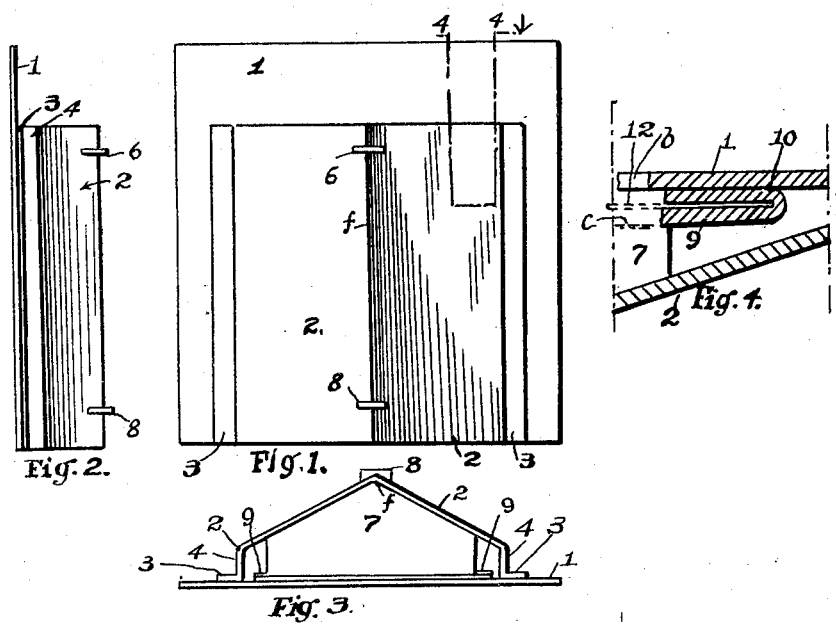
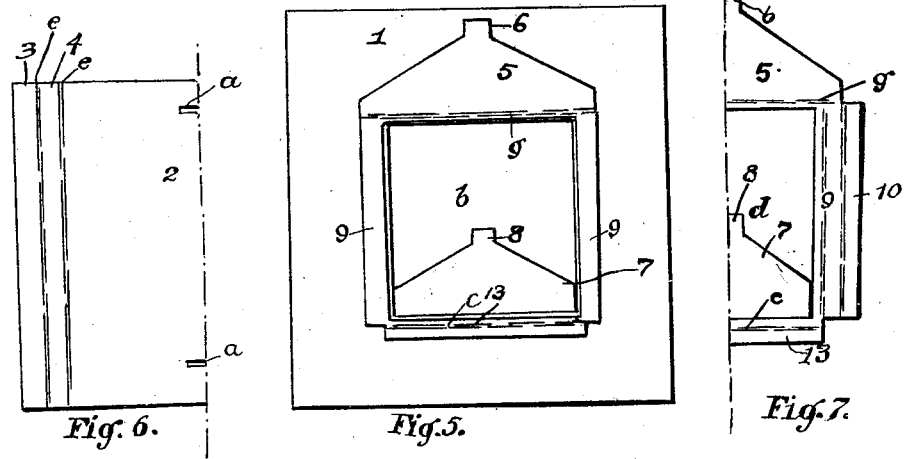
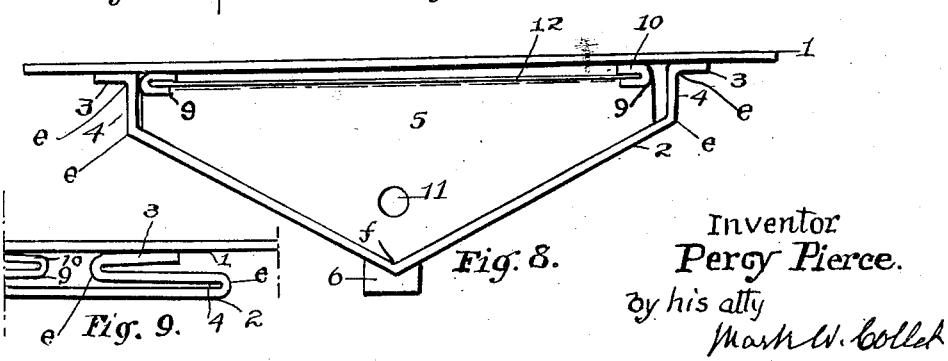
Inventor
Percy Pierce.
by his atty
Mark W. Collet Patented Apr. 7, 1931

1,799,178

UNITED STATES PATENT OFFICE

PERCY PIERCE, OF PHILADELPHIA, PENNSYLVANIA

PORTABLE KNOCKDOWN HOLDER FOR PICTURE SIGNS

Application filed April 15, 1929. Serial No. 355,339.

A knock down holder that is intended especially for advertising signs, must be very specially designed for its purpose. Among the requirements are that it be very cheap to make, strong yet simple in construction, readily knocked down and set up, light to carry, for the distributor has to carry a large number and distribute them on foot, and that it be not composed of easily separated parts that could be lost or mislaid. My device meets these requirements. It lies substantially flat when knocked down. All parts are permanently connected to each other, requiring only adjustments which are very simple, to set it up. When set up it supports itself firmly, contains a large surface for permanent advertising matter, but yet rests on a very small counter or window space.

The structure of my device combines with the above mentioned characteristics, a peculiar adaptability for use when changeable pictures are the advertising features, especially where these pictures are illuminated by a light placed behind them. The front portion of the advertising device is a frame for these pictures that is formed of two permanently connected pieces. The front piece of this frame has an opening through which the picture is shown. The back part of this frame forms the holder for the picture and also has the bracing and spacing flaps. This back part of the frame has openings through which the picture is illuminated when lighted from the rear. These flaps attached to the back part of the picture frame, space and secure the supporting member for the device (this supporting member of this type is known to the trade as the shield) to the picture frame. They also serve to screen any light placed in the chamber formed between them and the shield and from emergence at the top and bottom of the device.

I will now proceed to describe the best form of my device in detail.

Fig. 1 is a rear elevation of the device set up. Fig. 2 is a side elevation of the same. Fig. 3 is a plan of the bottom of the device set up. Fig. 4 is a section on line 4—4 of Fig. 1. Fig. 5 is an elevation of the device with the shield 2 removed and the picture holder knocked down. Fig. 6 is a plan of the left half of the shield. Fig. 7 is a plan of the right half of the picture holder. Fig. 8 is a top plan of the device set up. Fig. 4, 8 and 9 are on enlarged scales. Fig. 9 is a plan of part of the shield and frame when knocked down.

The front face 1 of the front piece of the frame outside of the opening for the picture can be used for permanent advertising matter. This front part 1 of the frame may be of any satisfactory size for this purpose. It has to be of sufficient size to have attached to it and to carry the back part of the frame, and the ears 3 of the shield 2, and has its bottom shaped to cooperate with the shield 2 to maintain the device in an upright position when set up. This front part 1 of the frame has a picture opening $b$ and when the picture 12 is carried in the frame, is intended to be illuminated by a light behind it, the back part of the frame also has an aperture $d$ that approximately registers with the picture opening $b$ in the front frame part 1.

The back part of the frame (see particularly Figs. 5 and 7) has the strips 9, 9. These strips are extended laterally to form the lugs 10, 10, that are folded over on an approximately vertical line, and are glued (see especially Fig. 4) to the back face of the front piece 1 of the frame, thus forming a slot between the parts 9 and 10 suitable for the insertion of a picture 12, crosswise strips 13 and 14 (see Figs. 5 and 7 particularly) connect these vertical strips 9, 9, to each other near their tops and bottoms. Hinged to these strips 13 and 14 are the spacing and bracing flaps, 5 and 7; preferably the strip 13 is integral with the flap 7 and the strip 14 integral with the flap 5, and the hinge is produced by scoring on lines, as $c$ and $g$ between the strips and flaps. Ordinarily the strip 13 is glued to the back face of the front piece 1 of the frame, forming a stop limiting the drop of the picture 12, and the upper strip 14 left free so that the picture 12 can be inserted between it and the piece 1 of the frame. The lower strip 13, however, need not be glued to the frame piece 1, and the picture allowed to pass between it and the frame and be held in place by friction or other means. The open space $d$ is for the illumination of the picture from its back, and can be omitted if no illumination from the picture from its back is desired. The upper flap 5 and the flap 7 of the back part of the frame fit against the inside of the shield 2 and form with it a chamber that is substantially closed, but yet sufficiently ventilated through the spaces at the sides of these flaps 5 and 7 to prevent over heating. The edges of the flaps 5 and 7, in practice run diagonally where they meet the shield 2.

The flaps 5 and 7 have the tongues 6 and 8 respectively that engage in slots $a$, $a$, in the shield 2, and hold these flaps in their horizontal positions. It is readily seen that the back portion of the frame can be cut out of a single piece of pasteboard by a single die stroke, which can also score the lines $c$ and $g$, and can fold over the lugs 10, so that they can be turned by hand completely until they and the strips 9 lie in the relative positions shown in Fig. 4.

The shield 2 is permanently attached to the front part 1 of the frame by the vertically running ears 3, 3, and the folding flaps 4 that connect the sides of the shield 2 to the ears 3. The ears, 3, 3, can be glued to the part 1. They are positioned on the part 1, so that the shield can lie flat against the frame when not held out from it by the flaps 5 and 7 by pushing towards the side edges of the part 1, the linking strip 4. It folds freely on a vertical fold $f$, and it and the linking strips 4 and ears 3 are preferably made integral with each other. The linking strips 4, 4, preferably should be of a width that when the shield 2 is flattened they will lie flat between it and the ears 3 and when set up will extend at substantial right angles from the part 1. The relative position of these parts in the knocked down state is indicated in Fig. 9. The shield 2, linking strip 4 and ear 3 are, in practice, made to fold freely at the folds, $e$, $e$. The picture 12 can be inserted and removed readily by sliding it in the slots formed between the parts 9 and 10, and, if of proper length, also will be held against bending by the strips between the back of the piece 1 and the strips 13 and 14. As the strip 14 is positioned away from the back of the piece 1, a distance equivalent to the thickness of the lug 10 and the slots between the parts 9 and 10, there can be no scraping of the face of the picture while being inserted or removed.

The device in its knock down state is set up by separating the shield from the frame, then pushing out the flaps 5, and 7 until they hold, extended backward, the shield 2 and the tongues 6 and 8 engage with the slots $a$, $a$, which will set up the device very securely. By positioning the shield 2 so that at its lower edge it rests on the surface of the support for the device, the whole device stands very solidly. The hole 11 can serve as a finger inlet, which is very advantageous in setting up and knocking down the device. The hole 11 serves normally for holding an electric bulb. The device can be made cheaply and effectively of strawboard or other like material.

The device is a simple one, but I do not desire to confine myself to the details of construction that I have set forth above as used preferably or in practice, for variations can be made in them. I therefore do not limit my invention to less than the combinations of elements set forth in my claims.

I claim:

1. In a knock-down advertising device for removably holding pictures, a frame consisting of a front piece having an opening through which the picture appears, and a back piece having strips positioned at each side of said opening in said front piece said strips being folded over on themselves inwardly and towards the opening in the said front piece of said frame, said folded over portions of said strips forming vertically running lugs, which lugs are permanently secured to the back of said front piece of said frame, said back piece of said frame having also crosswise horizontal strips connecting said vertical strips to each other at their top and bottom and also having bracing and spacing flaps hinged to said top and bottom crosswise strips, in combination with a shield provided with vertically running ears permanently attached to the back of said frame and with linking strips extending between the sides of said shield and said vertically running ears, said linking strips being hinged to said ears and to said shield at opposite sides of said strips, the edges of the flaps, hinged to the top and bottom of the back piece of said frame, fitting against the inside of the walls of the shield, when said flaps are turned into a horizontal position.

2. In a knock-down advertising device for removably holding pictures to be illuminated by a light placed behind them, a frame consisting of a front piece having an opening through which the picture appears, and a back frame piece, having two vertically running strips spaced from each other substantially the width of the opening in the front piece of the frame, the said vertical strips being each folded over on themselves lengthwise, and being glued to the back of the wall of said front piece with the fold in such strips away from the picture opening in the front piece of its frame on either side of the said opening for showing the picture, two horizontal cross strips positioned substantially on a level with the top and bottom of said vertically running strips and extending between them, the top horizontal cross strip being spaced away from the back face of the walls of the front piece of said frame, the said horizontally running strips having hinged thereto flaps falling into a position horizontally backwards from the said horizontally running strips, and a shield attached to the frame by vertical ears hinged to the side edges of the shield, the said flaps attached to the said horizontal pieces being of a size sufficient to extend the shield to its full extent away from the frame and fitting against the inner side of the walls of the same.

3. The device as defined in claim 2, wherein the said vertical strip therein mentioned, the horizontal pieces and the flaps hinged to the same are all integral with each other and form a single piece of cardboard.

4. The device as defined in claim 2 wherein the vertical ears therein mentioned are connected to the edges of the shield by vertical linking strips each hinged at its opposite sides to an edge of an ear and to an edge of the shield.

PERCY PIERCE.